United States Patent
Fujita et al.

(10) Patent No.: US 7,333,702 B2
(45) Date of Patent: Feb. 19, 2008

(54) FIBER OPTICS TRANSMISSION LINE

(75) Inventors: Jin Fujita, Kanagawa (JP); Yuichi Morishita, Kanagawa (JP); Kazuaki Morita, Kanagawa (JP)

(73) Assignee: SWCC Showa Device Technology Co., Ltd., Kanagawa (JP)

( * ) Notice: Subject to any disclaimer, the term of this patent is extended or adjusted under 35 U.S.C. 154(b) by 0 days.

(21) Appl. No.: 10/568,289

(22) PCT Filed: Aug. 24, 2004

(86) PCT No.: PCT/JP2004/012082

§ 371 (c)(1),
(2), (4) Date: Aug. 28, 2006

(87) PCT Pub. No.: WO2005/022217

PCT Pub. Date: Mar. 10, 2005

(65) Prior Publication Data

US 2007/0031095 A1    Feb. 8, 2007

(30) Foreign Application Priority Data

Aug. 29, 2003    (JP) .............................. 2003-305686

(51) Int. Cl.
*G02B 6/028*    (2006.01)
*G02B 6/26*    (2006.01)

(52) U.S. Cl. ......................................... 385/124; 385/31

(58) Field of Classification Search ................ 385/101, 385/31, 124

See application file for complete search history.

(56) References Cited

U.S. PATENT DOCUMENTS 5,588,078 A    12/1996    Cheng (Continued)

FOREIGN PATENT DOCUMENTS

JP    4-21803 A    1/1992

(Continued)

OTHER PUBLICATIONS

Shuto, et. al., "Generation Mechanism on Fiber Fuse Phenomenon" NTT Photonics Laboratories, Nippon Telegraph and Telephone Corp., p. 184 (2003).

(Continued)

*Primary Examiner*—Frank G. Font
*Assistant Examiner*—Charlie Peng
(74) *Attorney, Agent, or Firm*—Jeffrey S. Melcher; Manelli Denison & Selter, PLLC

(57) ABSTRACT

Even if a fiber fuse phenomenon occurs to start fire spreading, the fire spreading is shut off. A graded index fiber (GIF) 3 is inserted between transmission-use single mode fibers (SMF) 2a, 2b on a fiber optics transmission line 1. The GIF 3 is so designed that its mode field diameter (MFD) gradually increases from a light entry side. The MFD exhibits a maximum value at a location ¼ of a pitch from the end of the GIF 3. A GIF 3a is disposed on the light entry side. A GIF 3b having an MFD gradually decreasing is disposed on the opposite side of the GIF 3a. The GIF 3b is disposed on the light exit side. The lengths of the GIF 3a and GIF 3b are ¼ of a pitch. The length of the GIF 3 formed by connecting the both is ½ of a pitch. According to the present invention, an expanded MFD is inserted in the middle of the fiber optics transmission line, it is possible to shut off fire spreading caused due to fiber fuse phenomenon.

20 Claims, 9 Drawing Sheets

U.S. PATENT DOCUMENTS

| | | | |
|---|---|---|---|
| 5,841,583 A | 11/1998 | Bhagavatula | |
| 6,485,191 B1 * | 11/2002 | Sato | 385/73 |
| 7,031,567 B2 * | 4/2006 | Grinderslev et al. | 385/34 |
| 2002/0114554 A1 | 8/2002 | Maroney | |

FOREIGN PATENT DOCUMENTS

| | | |
|---|---|---|
| JP | 4-98206 A | 3/1992 |
| JP | 5-88022 A | 4/1993 |
| JP | 5-157931 A | 6/1993 |
| JP | 6-258554 A | 9/1994 |
| JP | 2001-228353 A | 8/2001 |
| JP | 2001-235637 A | 8/2001 |
| JP | 2002-214469 | 7/2002 |
| JP | 2002-214469 A | 7/2002 |
| JP | 2002-277685 A | 9/2002 |
| JP | 2002-323639 A | 11/2002 |
| JP | 2002-372636 A | 12/2002 |
| JP | 2003-131066 A | 5/2003 |
| JP | 22003-131066 A | 5/2003 |
| JP | 2004-61830 A | 2/2004 |
| JP | 2004-77658 A | 3/2004 |
| JP | 2004-86127 A | 3/2004 |
| JP | 2004-134660 | 4/2004 |
| JP | 2004-134660 A | 4/2004 |

OTHER PUBLICATIONS

Nimishura, et. al. "Study of high-poers endurance characteristics in optical fiber link" TuC4 Fitel Photonics Laboratory, The Furukawa Electric Co., Ltd., 6, Yawata-kigandori, Ichihara, Chiba 290-8555 Japan pp. 193-195 (2000).

* cited by examiner a light entry

FIBER OPTICS TRANSMISSION LINE

TECHNICAL FIELD

The present invention relates to a fiber optics transmission line that shuts off fire spreading due to fiber fuse phenomenon which occurs when a high-power light is transmitted through a fiber optics.

BACKGROUND ART

In recent years, introduction of an FTTH (Fiber To The Home) plan has been started in many areas and, correspondingly, utilization of high-speed Internet in the home has been rapidly increasing. Under such a situation, enhancement of a fiber optics communication network has become necessary. To attain this, techniques such as a WDM (Wavelength Division Multiplex) scheme have come to be used.

In the WDM scheme, a transmission signal requires an optical power far higher than before. For example, orders of several Watts of optical power are required. Therefore, the edge face of a fiber optics for optical transmission may be burn out or a core may be burn out in an optical transmission line at a portion thereof with low resistance to an optical power, in some cases.

When a core is burn out in the optical transmission line at a portion with low resistance to an optical power, the burn-out portion spreads toward the light source direction in a chain reaction like a fuse wire, that is, fiber fuse phenomenon occurs (refer to, for example, Non-Patent Document 1 and Non-Patent Document 2).

Once such fire spreading due to the fiber fuse phenomenon occurs, it reaches up to a light source through a fusion spliced portion and a connector connection portion. This may lead eventually to breakage of devices such as a transmitter or amplifier.

It is thought that a factor causing the fiber fuse phenomenon includes high temperature, high optical power density, and light absorption by devices. At the fuse spliced portion, for example, the fiber fuse phenomenon is caused due to misalignment in the spliced portion. At the detachable connector point, a light is often absorbed by the stain of the edge face thereof, which increases the temperature to make it easy to cause the fiber fuse phenomenon. Since the fiber fuse phenomenon is thus easy to occur at the portion including a light absorber, a dopant contained in a core glass, such as Ge, can become a cause thereof.

Further, under the condition that the same light power is applied, a higher power density is obtained with a smaller effective sectional area of the propagation mode. The effective sectional area is nearly equal to a mode field diameter. Accordingly, a smaller mode field diameter allows easy occurrence of the fiber fuse phenomenon.

Several countermeasures have been taken to prevent the above fiber fuse phenomenon. For example, there is available a method that prevents occurrence of the fiber fuse phenomenon by expanding the core diameter of a single-mode fiber at the connector edge face (refer to, for example, Patent Document 1). Further, there is available an apparatus that, when the fiber fuse phenomenon occurs, uses a collimator lens to shut off the subsequent fire spreading (refer to, for example, Patent Document 2).

[Non Patent Document 1] The 2003 IEICE (Institute of Electronics, Information and Communication Engineers) General Conference, C-3-44, page 184

[Non Patent Document 2] Technical Digest of Optical Amplifiers & their applications Topical meeting, Otaru, Japan, 2003 (Optical society of America, Washington, D.C.) TuC4, pages 193 to 195

[Patent Document 1] Jpn. Pat. Appln. Laid-Open Publication No. 2002-277685

[Patent Document 2] Jpn. Pat. Appln. Laid-Open Publication No. 2002-323639

DISCLOSURE OF INVENTION

The Subject which Invention Should Solve

There are the following problems to be solved in the above prior arts.

The method disclosed in Patent Document 1 uses a TEC (Thermal Expanded Core) technique that applies heat to a single-mode fiber to diffuse Ge contained in the core to thereby expand its core diameter. However, there is a limit to the range of the core diameter that can be expanded, and it is hard to say that a satisfactory effect can be obtained. Further, a use of the TEC technique complicates its manufacturing process, resulting in higher cost.

In the case of the apparatus disclosed in Patent Document 2, a space transmission region (fiber isolation region) defined by a collimator pair needs to be provided to increase the apparatus size. Further, a use of the collimator lens increases cost.

The present invention has been made in view of the above points, and an object thereof is to provide a fiber optics transmission line capable of satisfactorily shutting off fire spreading caused due to fiber fuse phenomenon with a simple structure.

Configuration to Solve the Subject

The present invention adopts the following configurations to solve the above points.

(1) A fiber optics transmission line characterized in that single or a plurality of a graded index fiber is inserted in the middle of a transmission line formed by a single mode fiber, the single mode fiber including a core having a predetermined refractive index and a cladding having a refractive index smaller than that of the core.

With the above configuration, it is possible to effectively shut off fire spreading caused due to fiber fuse phenomenon.

(2) The fiber optics transmission line according to the configuration (1), characterized in that the graded index fiber is fusion spliced to the single mode fiber in the middle of the fiber optics transmission line.

The above fusion splicing prevents light reflection, reducing connection loss.

(3) The fiber optics transmission line according to the configuration (1), characterized in that the inserted graded index fiber is so designed that its mode field diameter gradually increases from a light entry side and decreases toward a light exit side.

With the above configuration, it is possible to shut off fire spreading caused due to fiber fuse phenomenon more reliably.

(4) The fiber optics transmission line according to the configuration (3), characterized in that the length of the graded index fiber having a mode field diameter gradually increasing from a light entry side and decreasing toward a light exit side is ½ of a pitch, where one pitch denotes a length of the transmission line corresponding to one cycle during which the mode filed diameter of a light periodically changes along the transmission line.

By setting the length of the graded index fiber to ½ of a pitch, it is possible to expand the mode field diameter most effectively.

(5) The fiber optics transmission line according to the configuration (4), characterized in that the length of the graded index fiber having a mode field diameter gradually increasing from a light entry side and the length of the graded index fiber having a mode filed diameter decreasing toward a light exit side, are both ¼ of a pitch.

With the above configuration, it is possible to connect the graded index fibers at a point where their mode field diameters are expanded most and to make the length of the connected graded index fiber ½ of a pitch.

(6) The fiber optics transmission line according to the configuration (3), characterized in that a single mode fiber having an expanded mode field diameter is inserted between the graded index fiber having a mode field diameter gradually increasing from a light entry side and the graded index fiber having a mode filed diameter decreasing toward a light exit side.

When a single mode fiber having an expanded mode field diameter is inserted between graded index fibers as described above, it is possible to obtain a stable expanded mode field diameter.

(7) The fiber optics transmission line according to the configuration (3), characterized in that a single mode fiber having a mode field diameter smaller than the expanded mode field diameter of the graded index fiber is inserted between the graded index fiber having a mode field diameter gradually increasing from a light entry side and the graded index fiber having a mode filed diameter decreasing toward a light exit side.

With the above configuration, it is possible to shut off fire spreading caused due to fiber fuse phenomenon more reliably.

(8) The fiber optics transmission line according to the configuration (3), characterized in that the expanded mode field diameter of the graded index fiber falls within a range from 15 to 85 μm.

With the above configuration, it is possible to obtain a sufficient mode field diameter for shutting off fire spreading caused due to fiber fuse phenomenon. In addition, this prevents the mode field diameter from falling below the core diameter of the graded index fiber, preventing an increase in connection loss.

(9) The fiber optics transmission line according to the configuration (8), characterized in that the expanded mode field diameter of the graded index fiber falls within a range from 15 to 65 μm.

With the above configuration, it is possible to reduce connection loss stably.

(10) The fiber optics transmission line according to the configuration (3), characterized in that the core diameter of the graded index fiber is 1.5 times or more the expanded mode field diameter of the graded index fiber, which is obtained at a location ¼ of a pitch from the light entry side thereof.

With the above configuration, it is possible to always set the mode field diameter within the core size of the graded index fiber, preventing deterioration in light propagation condition.

(11) The fiber optics transmission line according to the configuration (10), characterized in that the core diameter of the graded index fiber is 2 times or more the expanded mode field diameter of the graded index fiber, which is obtained at a location ¼ of a pitch from the light entry side thereof.

(12) The fiber optics transmission line according to the configuration (1), characterized in that the graded index fiber is connected to the single mode fiber through a connector in the middle of the fiber optics transmission line.

The above connector connection allows a mechanically simple connection, increasing operating efficiency.

(13) The fiber optics transmission line according to the configuration (12), characterized in that the inserted graded index fiber is so designed that its mode field diameter gradually increases from a light entry side and decreases toward a light exit side.

(14) The fiber optics transmission line according to the configuration (13), characterized in that the length of the graded index fiber having a mode field diameter gradually increasing from a light entry side and decreasing toward a light exit side is ½ of a pitch, where one pitch denotes a length of the transmission line corresponding to one cycle during which the mode filed diameter of a light periodically changes along the transmission line.

(15) The fiber optics transmission line according to the configuration (14), characterized in that the length of the graded index fiber having a mode field diameter gradually increasing from a light entry side and the length of the graded index fiber having a mode filed diameter decreasing toward a light exit side, are both ¼ of a pitch.

(16) The fiber optics transmission line according to the configuration (13), characterized in that a single mode fiber having an expanded mode field diameter is inserted between the graded index fiber having a mode field diameter gradually increasing from a light entry side and the graded index fiber having a mode filed diameter decreasing toward a light exit side.

(17) The fiber optics transmission line according to the configuration (13), characterized in that a single mode fiber having a mode field diameter smaller than the expanded mode field diameter of the graded index fiber is inserted between the graded index fiber having a mode field diameter gradually increasing from a light entry side and the graded index fiber having a mode filed diameter decreasing toward a light exit side.

(18) The fiber optics transmission line according to the configuration (13), characterized in that the expanded mode field diameter of the graded index fiber falls within a range from 15 to 85 μm.

(19) The fiber optics transmission line according to the configuration (18), characterized in that the expanded mode field diameter of the graded index fiber falls within a range from 15 to 65 μm.

(20) The fiber optics transmission line according to the configuration (13), characterized in that the core diameter of the graded index fiber is 1.5 times or more the expanded mode field diameter of the graded index fiber, which is obtained at a location ¼ of a pitch from the light entry side thereof.

(21) The fiber optics transmission line according to the configuration (20), characterized in that the core diameter of the graded index fiber is 2 times or more the expanded mode field diameter of the graded index fiber, which is obtained at a location ¼ of a pitch from the light entry side thereof.

(22) The fiber optics transmission line according to the configuration (1), characterized in that the graded index fiber is connected to the single mode fiber through a V-groove in the middle of the fiber optics transmission line.

The above V-groove connection allows fiber optics having different outer diameters to be easily connected to each other.

(23) The fiber optics transmission line according to the configuration (22), characterized in that the inserted graded index fiber is so designed that its mode field diameter gradually increases from a light entry side and decreases toward a light exit side.

(24) The fiber optics transmission line according to the configuration (23), characterized in that the length of the graded index fiber having a mode field diameter gradually increasing from a light entry side and decreasing toward a light exit side is ½ of a pitch, where one pitch denotes a length of the transmission line corresponding to one cycle during which the mode filed diameter of a light periodically changes along the transmission line.

(25) The fiber optics transmission line according to the configuration (24), characterized in that the length of the graded index fiber having a mode field diameter gradually increasing from a light entry side and the length of the graded index fiber having a mode filed diameter decreasing toward a light exit side, are both ¼ of a pitch.

(26) The fiber optics transmission line according to the configuration (23), characterized in that a single mode fiber having an expanded mode field diameter is inserted between the graded index fiber having a mode field diameter gradually increasing from a light entry side and the graded index fiber having a mode filed diameter decreasing toward a light exit side.

(27) The fiber optics transmission line according to the configuration (23), characterized in that a single mode fiber having a mode field diameter smaller than the expanded mode field diameter of the graded index fiber is inserted between the graded index fiber having a mode field diameter gradually increasing from a light entry side and the graded index fiber having a mode filed diameter decreasing toward a light exit side.

(28) The fiber optics transmission line according to the configuration (23), characterized in that the expanded mode field diameter of the graded index fiber falls within a range from 15 to 85 μm.

(29) The fiber optics transmission line according to the configuration (28), characterized in that the expanded mode field diameter of the graded index fiber falls within a range from 15 to 65 μm.

(30) The fiber optics transmission line according to the configuration (23), characterized in that the core diameter of the graded index fiber is 1.5 times or more the expanded mode field diameter of the graded index fiber, which is obtained at a location ¼ of a pitch from the light entry side thereof.

(31) The fiber optics transmission line according to the configuration (30), characterized in that the core diameter of the graded index fiber is 2 times or more the expanded mode field diameter of the graded index fiber, which is obtained at a location ¼ of a pitch from the light entry side thereof.

EXPLANATION OF A MARK 1 fiber optics transmission line
2 transmission-use single mode fibers (SMF)
3 GIF
4 connection portion
5 light source
6 fiber fuse phenomenon
7 SMF having an expanded MFD
8 Connector
9 Ferrule
10 Adapter
11 SMF having a normal MFD
12 SMF having a smaller MFD

BEST MODE FOR CARRYING OUT THE INVENTION

Figure 1:
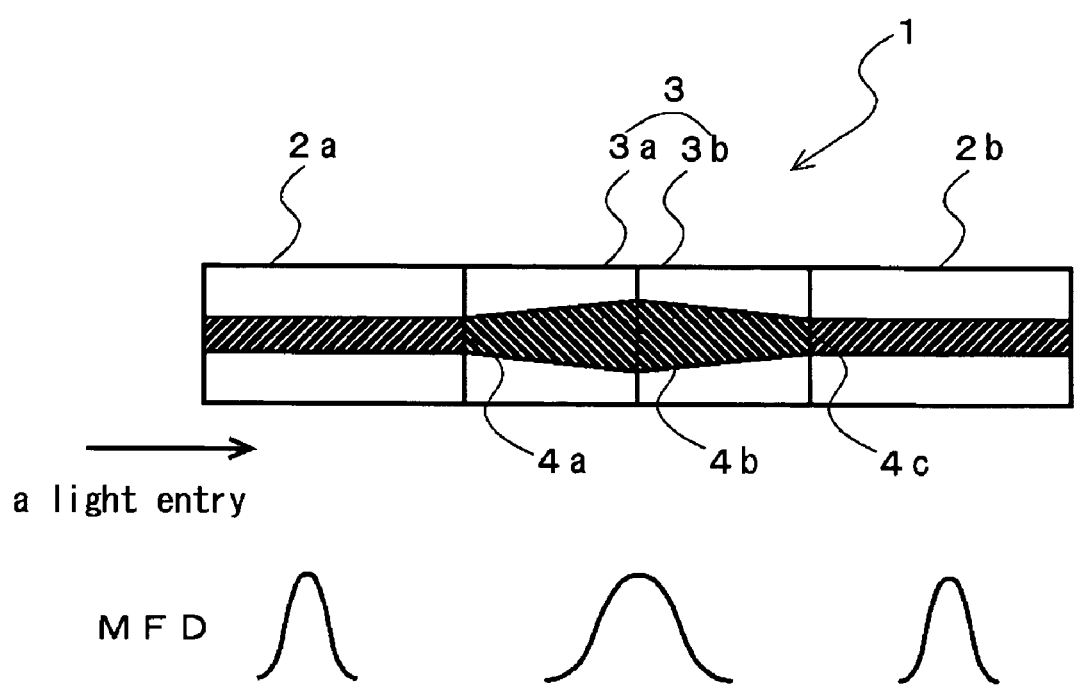
FIG. 1 is a cross-sectional view explaining an embodiment of the present invention.

FIG. 1 is a cross-sectional view for explaining an embodiment of a fiber optics transmission line according to the present invention. In FIG. 1, a graded index fiber (GIF) 3 is inserted between transmission-use single mode fibers (SMF) 2a, 2b on a fiber optics transmission line 1 of the present invention. The length of the GIF 3 is ½ of a pitch. As is well known, the mode field diameter (MFD) of a light transmitted through the GIF changes continuously and periodically along the transmission line such that it assumes "minimum value—maximum value—minimum value—maximum value". In this embodiment, "pitch" denotes a length corresponding to one cycle of the change.

As shown in FIG. 1, a light is transmitted through the SMF 2a, GIF 3a, GIF 3b, and SMF 2b in the order mentioned in the direction of the arrow. The GIF 3a is so designed that its MFD gradually increases from a light entry side, and the MFD thereof exhibits a maximum value at a location ¼ of a pitch from the end of the light entry end. The length of the GIF 3a is set to ¼ of a pitch. The output side of the GIF 3a is connected to the input side of the GIF 3b. The GIF 3b is so designed that its MFD gradually decreases from a light entry side, and the MFD thereof exhibits a minimum value at a location ¼ of a pitch from the end of the light entry end.

The length of the GIF 3b is also set to ¼ of a pitch. The output side of the GIF 3b is connected to the input side of the SMF 2b. The length of the GIF 3 formed by connecting the GIF 3a and GIF 3b each having length of ¼ of a pitch is ½ of a pitch.

With the above configuration, the MFDs on both sides of a connection portion 4a between the SMF 2a on the light entry side and GIF 3a become nearly equal to each other, with the result that connection loss does not occur. The MFD gradually increases from the connection portion 4a and becomes a maximum value at a connection portion 4b between the GIF 3a and GIF 3b. Also at this connection portion 4b, the MFDs on both sides thereof become nearly equal to each other and, accordingly, connection loss does not occur. The MFD of the GIF 3b, which gradually decreases towards the light exit side, is connected to the SMF 2b on the light exit side. At a connection portion 4c, the MFD becomes nearly equal to an MFD of a normal transmission-use SMF. Therefore, connection loss does not occur. For the sake of clarity, the fiber optics transmission line of FIG. 1 is shown schematically, and the same applies to the following figures.

Since a portion having a larger MFD is inserted in the middle of the fiber optics transmission line as described above, fire spreading disperses at the portion having a larger MFD even if the fiber fuse phenomenon occurs to start the fire spreading. Therefore, it is possible to shut off the fire spreading caused due to the fiber fuse phenomenon.

Figure 2:
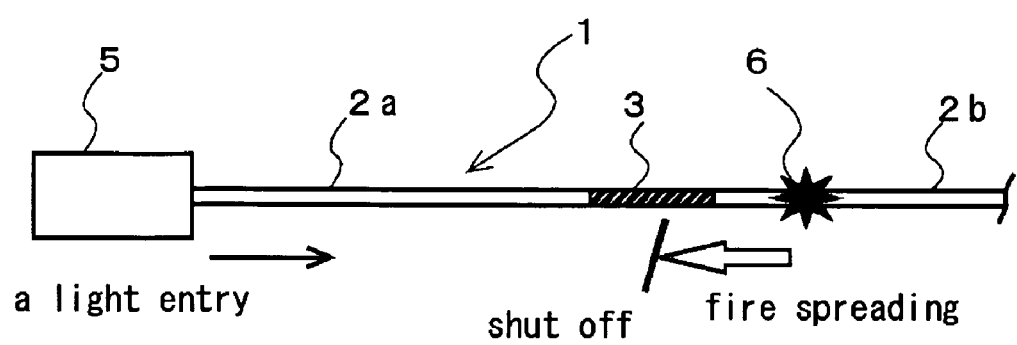
FIG. 2 is a view explaining a state where fiber fuse phenomenon is being shut off.

FIG. 2 is a view schematically explaining a state where the fiber fuse phenomenon is being shut off on the fiber optics transmission line of the present invention. In FIG. 2, the same parts as those in FIG. 1 are indicated by the same reference numerals, and the same is applied to the following figures.

In FIG. 2, a light is emitted from a light source 5 such as an optical transmitter or an optical amplifier in the direction along the arrow and enters the fiber optics transmission line 1 on which the GIF 3 is inserted between the transmission-use SMFs 2a and 2b. In the case where fiber fuse phenomenon 6 occurs for some reasons on the transmission line, fire spreads toward the light source 5 as indicated by the thick arrow. However, existence of the GIF 3 of the present invention, which has been inserted in the middle of the transmission line, shuts off the fiber fuse phenomenon 6 to prevent the fire spreading from reaching the light source, thereby ensuring safety of the fiber optics or devices on the transmission line.

It is preferable that the length of the GIF 3 be ½ of a pitch. The reason is described below. The GIF 3 has a maximum MFD value at a location ¼ of a pitch from the end of the GIF 3. Accordingly, by setting the lengths of the GIF 3a and GIF 3b that constitute the GIF 3 to ¼ of a pitch, it is possible to expand the MFD most effectively, contributing to the shut-off of the fire spreading caused due to the fiber fuse phenomenon.

Figure 3:
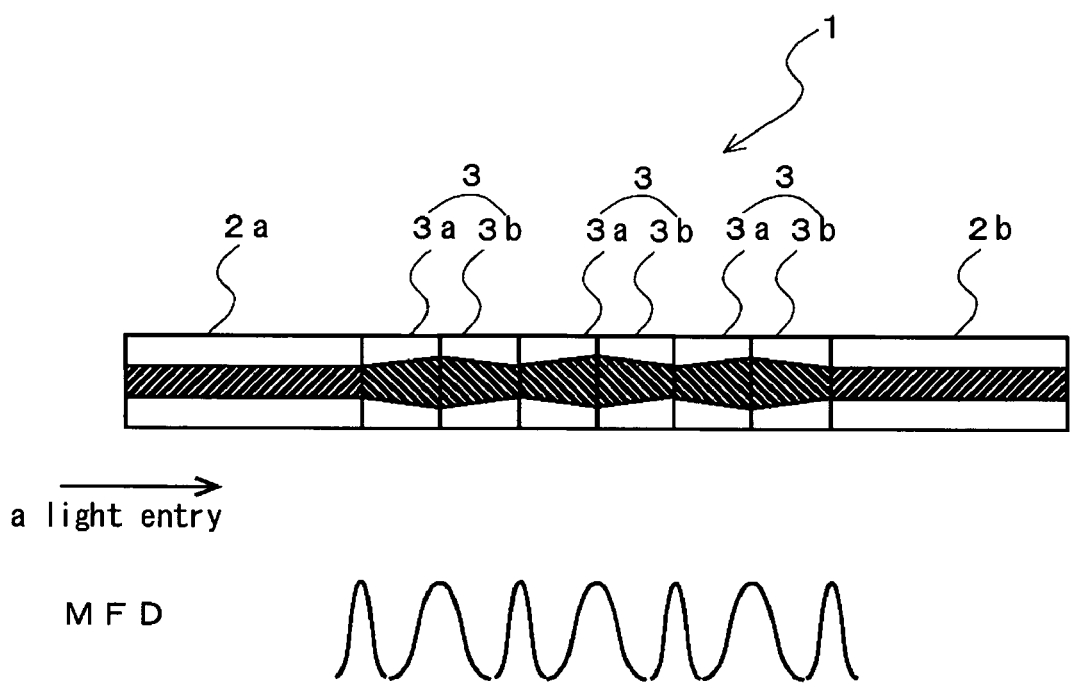
FIG. 3 is a cross-sectional view explaining another embodiment of the present invention.

A plurality of series-connected GIFs 3 may be inserted in the middle of the transmission line, as shown in FIG. 3. With this configuration, it is possible to shut off the fire spreading caused due to the fiber fuse phenomenon more reliably.

Each of the GIF 3a and GIF 3b that constitute the GIF 3 has a maximum MFD value at a location ¼ of a pitch from the end of the GIF 3a or that of the GIF 3b. It is preferable that the maximum value be a range from 15 µm to 85 µm. The reason is described below. 15 µm or less is not sufficient to obtain the shut-off effect. When the MFD exceeds 85 µm, the core diameter of the GIF may become smaller than the MFD. In this case, there is a possibility that connection loss becomes large.

Particularly, in order to stably avoid the connection loss, it is more preferable that the value of the MFD be a range from 15 µm to 65 µm.

Figure 4:
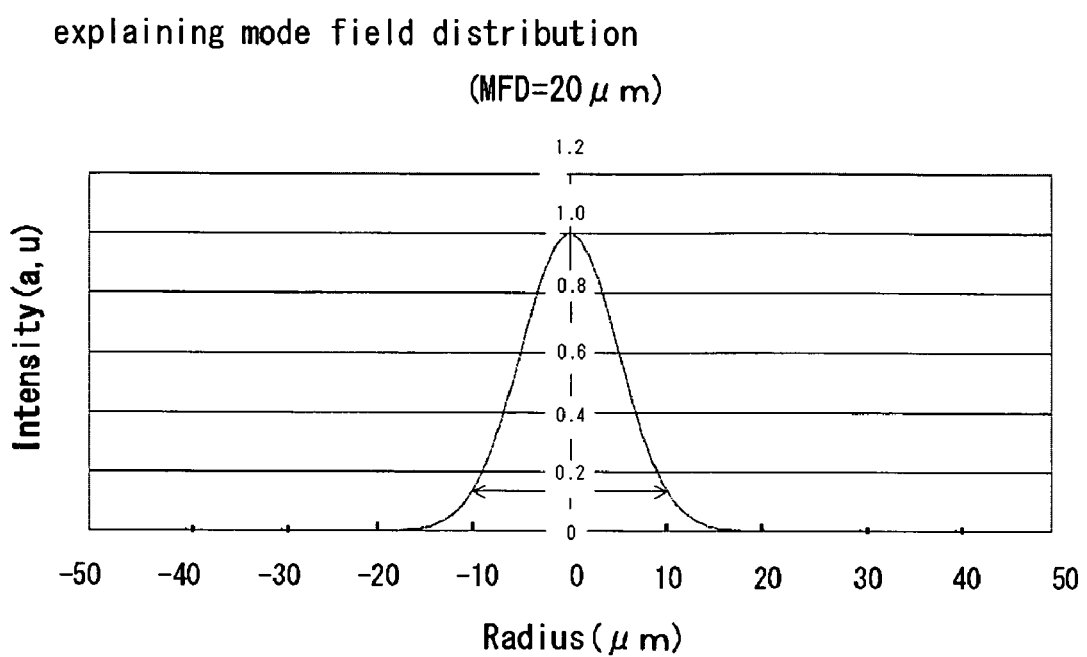
FIG. 4 is a view explaining mode field distribution.

The core diameter of the GIF should be set to a value 1.5 times the MFD, and preferably to a value 2 times or more. This is because that light propagation condition may deteriorate in the case where the MFD is too large to be set within the core size. The normal mode field distribution is about 2 times the MFD as shown in FIG. 4 (here, MFD is set to 20 µm). In order to set the mode filed distribution within the core size, the core diameter should be set to a value at least 1.5 times or more the MFD, and preferably to a value two times or more.

Figure 5:
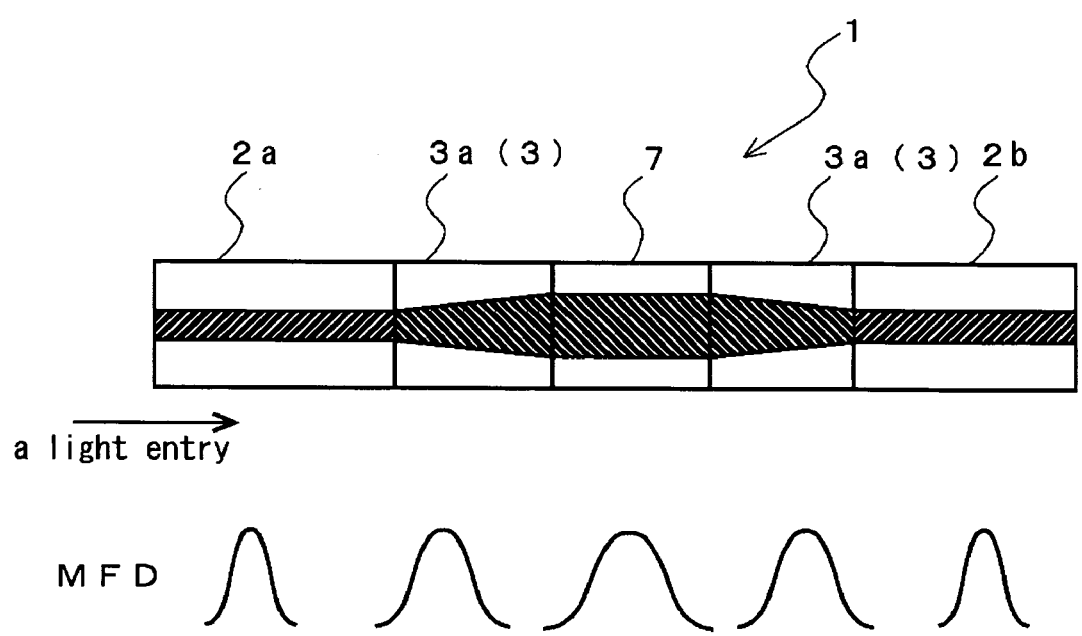
FIG. 5 is a cross-sectional view explaining still another embodiment of the present invention.

Another embodiment of the present invention will next be described. FIG. 5 shows a fiber optics transmission line on which an SMF 7 having an expanded MFD is inserted between the GIF 3 (GIF 3a and GIF 3b). With the above configuration, expansion state of the MFD becomes stable to shut off the fire spreading caused due to the fiber fuse phenomenon more reliably.

Examples of the SMF having an expanded MFD include a step index fiber having a large core diameter and a small relative refractive index difference, a photonic crystal fiber having an effective core diameter, and a holey fiber.

In the examples shown in FIGS. 1, 3, or 5, the GIF is inserted in the middle of the fiber optics transmission line using a fusion splicing technique. The fusion splicing can effectively be performed when the outer diameter of the GIF 3 is equal to the outer diameters of the transmission-use SMFs 2a and 2b. However, the outer diameter is not particularly limited. A difference between the outer diameters of the GIF and transmission-use SMF experiences no inconvenience unless it adversely affects the connection loss.

Figure 6:
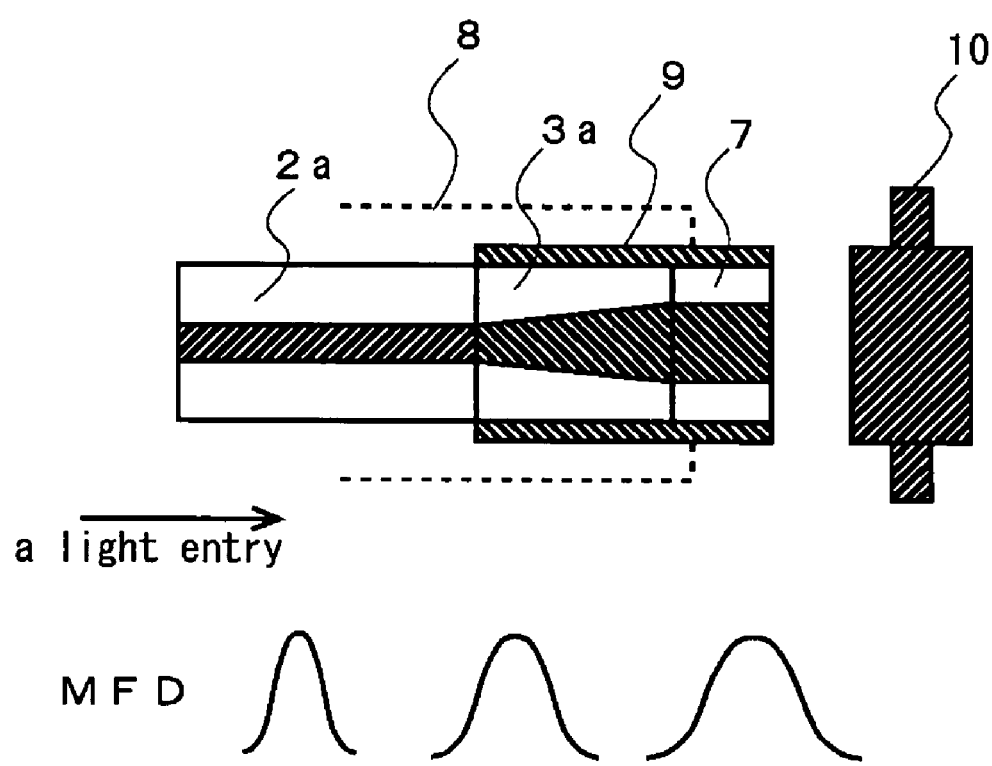
FIG. 6 is a cross-sectional view explaining still another embodiment of the present invention.

Still another embodiment of the present invention will next be described. In this embodiment, the GIF is housed in a connector and is then connected to the fiber optics through the connector in the middle of the fiber optics transmission line. In FIG. 6, for example, the SMF 2a and GIF 3a are fusion spliced together. The configuration of the GIF 3a is the same as that shown in FIG. 1 or FIG. 5. An SMF 7 having an expanded MFD is inserted into a ferrule 9 of a connector 8. The ferrule 9 and an adapter 10 are connected to each other through the connector 8 at one side of the adopter 10. Another connector according to the present embodiment, which has the same configuration as the connector 8, can be connected to the other side of the adapter 10. As a result, it is possible to easily connect the connectors each having a function of shutting off the fire spreading caused due to the fiber fuse phenomenon.

Figure 7:
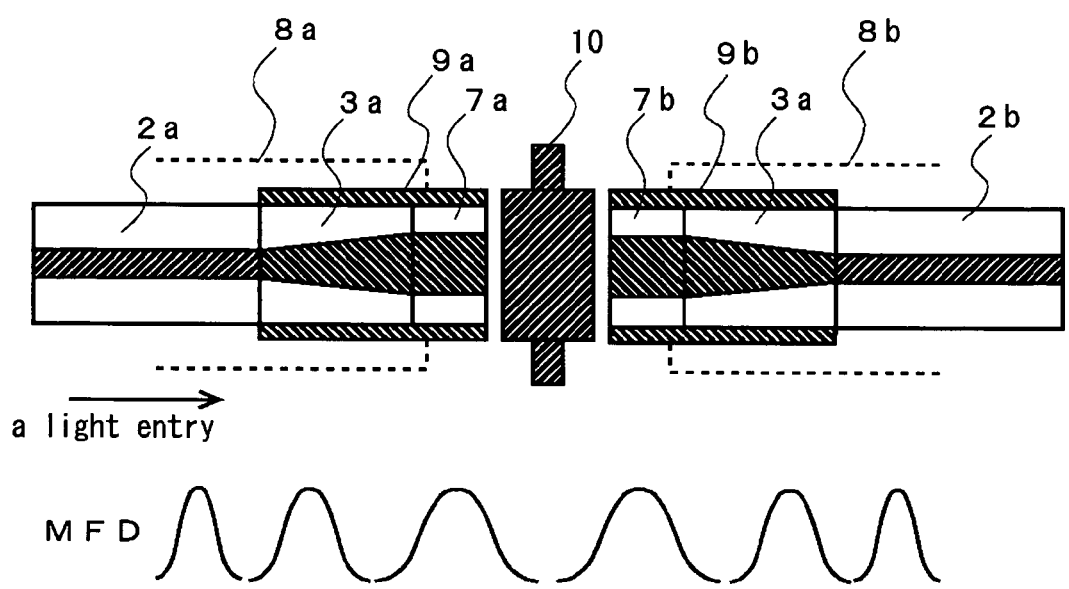
FIG. 7 is a cross-sectional view explaining still another embodiment of the present invention.

FIG. 7 is a cross-sectional view of a fiber optics transmission line obtained by the connection between connectors. A state of MFD of each part at the connector edge face (ferrule end face) is shown in the lower side in the drawing as a graph. In FIG. 7, SMFs each having an expanded MFD are connected to each other. The GIFs 3a and 3a are connected respectively to the normal SMFs 2a and 2b. SMFs 7a and 7b are connected respectively to the GIF 3a and 3a. The part obtained by connecting the GIF 3a and SMF 7a is inserted into a ferrule 9a of a connector 8a and connected to the adapter 10 at one side of the adapter 10. Similarly, the part obtained by connecting the GIF 3a and SMF 7b is inserted into a ferrule 9b of a connector 8b and connected to the other side of the adapter 10.

Figure 8:
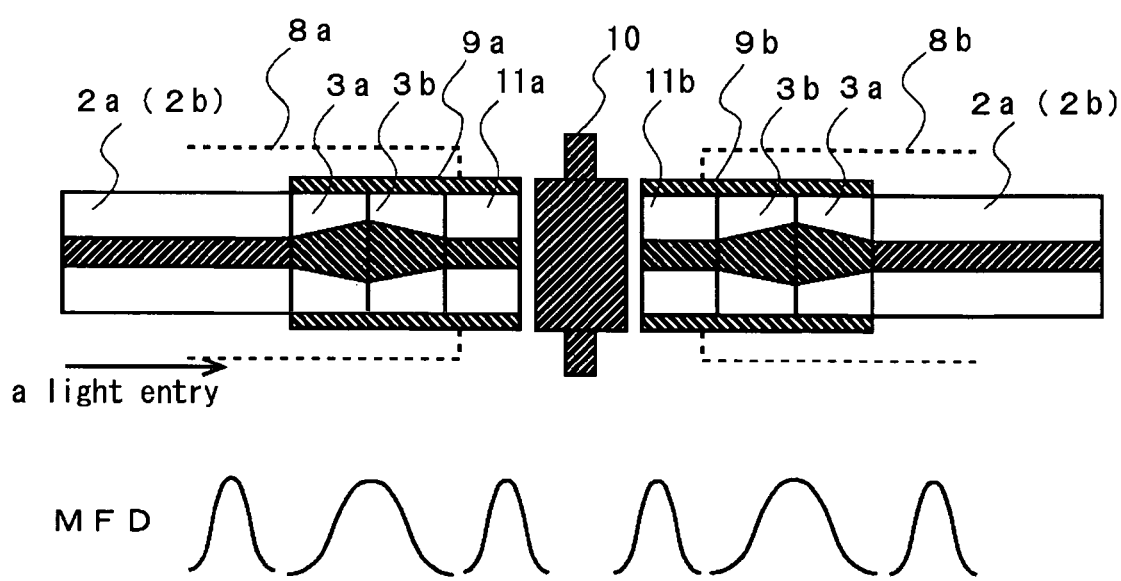
FIG. 8 is a cross-sectional view explaining still another embodiment of the present invention.

FIG. 8 is a cross-sectional view showing an example in which SMFs, each of which has a normal MFD and is connected to the ferrule end face, are connected to each other. The GIFs 3a and 3b are connected to the normal SMF 2a (2b). Further, SMFs 11a and 11b each having a normal MFD are connected to the GIF 3a and 3b. The part obtained by connecting the GIF 3a, GIF 3b, and SMF 11a is inserted into the ferrule 9a of and connected to one side of the adapter 10. Similarly, the part obtained by connecting the GIF 3a, GIF 3b, and SMF 11b is inserted into the ferrule 9b and connected to the other side of the adapter 10.

Figure 9:
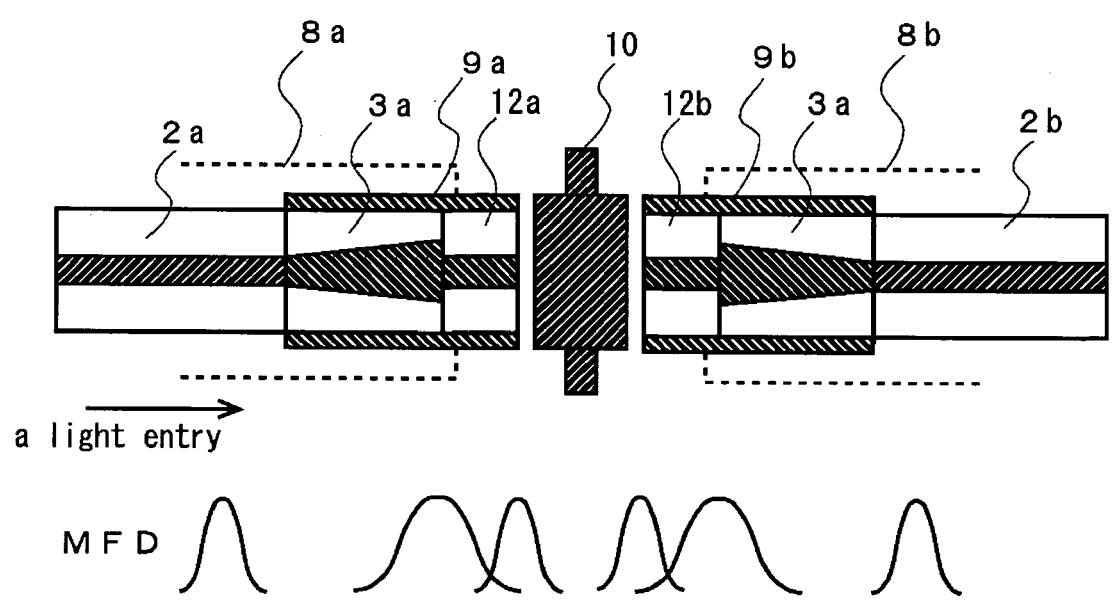
FIG. 9 is a cross-sectional view explaining still another embodiment of the present invention.

FIG. 9 shows an example in which an SMF is connected to the end face of a GIF having an expanded MFD, the SMF having a smaller MFD than that of the GIF. The GIFs 3a and 3a are connected respectively to the normal SMFs 2a and 2b. SMFs 12a and 12b each having a smaller MFD than those of the end faces of the GIFs 3a and 3a are connected respectively to the GIF 3a and 3a. The part obtained by connecting the GIF 3a and SMF 12a is inserted into the ferrule 9a and connected to one side of the adapter 10. Similarly, the part obtained by connecting the GIF 3a and SMF 12b is inserted into the ferrule 9b and connected to the other side of the adapter 10.

With the above various connection methods, a fiber optics transmission line that can shuts off the fire spreading caused due to the fiber fuse phenomenon can be provided. The fiber optics transmission line according to the present invention is of course not limited to the above embodiments, and various modifications can be made to the connection method without departing from the spirit or scope of the invention. For example, a mechanical connection using a V-groove, or connection using an optical switch or optical isolator can be adopted.

EXAMPLE 1

A fiber optics transmission line having the configuration shown in FIG. 1 was prepared, in which a GIF whose MFD was expanded up to 40 µm and core diameter set to 60 µm was inserted into a fiber optics. When an optical signal was transmitted from a Raman amplifier having a wavelength of 1550 nm and an optical power of 3 W into the fiber optics transmission line thus formed, fiber fuse phenomenon occurred. The MFD of a transmission-use SMF at this time was 10 µm. Although fire spreading toward a light source due to the fiber fuse phenomenon started, the fire spreading was shut off in the GIF.

The total connection loss between the transmission-use SMF 2a and GIF 3a, between GIF 3a and GIF 3b, and between GIF 3b and transmission-use SMF 2b obtained in a state where the fiber fuse phenomenon is absent was only 0.1 dB or less.

EXAMPLE 2

A fiber optics transmission line having the configuration shown in FIG. 5 was prepared, in which a GIF whose MFD was expanded up to 30 µm and core diameter set to 45 µm and an MFD-expanded SMF were inserted into a fiber optics. When an optical signal was transmitted from a YAG laser having a wavelength of 1050 nm and an optical power of 2 W into the fiber optics transmission line thus formed, fiber fuse phenomenon occurred. The MFD of a transmission-use SMF at this time was 8 µm. Although fire spreading toward a light source due to the fiber fuse phenomenon started, the fire spreading was shut off in the MFD-expanded SMF.

In this example, an NSP (Non-Strippable Primary Coating) SMF was used as a transmission-use SMF. This SMF and GIF were mechanical connected by a V-groove, and matching oil was applied to the fiber end face. The total connection loss between the transmission-use SMF 2a and GIF 3a, between GIF 3a and MFD-expanded SMF 7, between MFD-expanded SMF 7 and GIF 3a, and GIF 3a and transmission-use SMF 2b obtained in a state where the fiber fuse phenomenon is absent was only 0.1 dB or less.

EXAMPLE 3

A fiber optics transmission line having the configuration shown in FIG. 7 was prepared, in which a fiber-fuse phenomenon shut-off part constituted by a GIF whose MFD was expanded up to 50 µm and core diameter set to 100 µm and an MFD-expanded SMF was connected to one side optical switch, in place of an adapter and, similarly, another fiber-fuse phenomenon shut-off part constituted by a GIF whose MFD was expanded up to 50 µm and an MFD-expanded SMF was connected to the other side of the optical switch. When an optical signal was transmitted from a femtosecond laser having a wavelength of 1550 nm and an optical power of 4 W into the fiber optics transmission line thus formed, fiber fuse phenomenon occurred. The MFD of a transmission-use SMF at this time was 7.5 µm. Although fire spreading toward a light source due to the fiber fuse phenomenon started, the fire spreading was shut off in front of the optical switch.

The total connection loss between the transmission-use SMF 2a and GIF 3a, between GIF 3a and MFD-expanded SMF 7a, between MFD-expanded SMF 7a and optical switch, between optical switch and MFD-expanded SMF 7b, between MFD-expanded SMF 7b and GIF 3a, and GIF 3a and transmission-use SMF 2b obtained in a state where the fiber fuse phenomenon is absent was only 0.1 dB or less. In this example, an optical switch with operating wavelength of 1550 nm and insertion loss of 0.5 dB and 25 dB at operating voltage of 0 V and 10 V, respectively was used.

EXAMPLE 4

A fiber optics transmission line having the configuration shown in FIG. 8 was prepared, in which a pair of fiber-fuse phenomenon shut-off parts each constituted by a GIF whose MFD was expanded up to 20 µm and core diameter set to 45 µm and an MFD-expanded SMF were connected to each other by an optical isolator, in place of an adapter. When an optical signal was transmitted from a DFB (Distributed FeedBack) laser having a wavelength of 1550 nm and an optical power of 1.5 W into the fiber optics transmission line thus formed, fiber fuse phenomenon occurred. The MFD of a transmission-use SMF at this time was 10 µm. Although fire spreading toward a light source due to the fiber fuse phenomenon started, the fire spreading was shut off in front of the optical isolator. In this example, an HNA (High Numerical Apperture) SMF was used as a transmission-use SMF.

The total connection loss between the transmission-use SMF 2a and GIF 3a, between GIF 3a and MFD-expanded SMF 7a, between MFD-expanded SMF 7a and optical isolator, between optical isolator and MFD-expanded SMF 7b, between MFD-expanded SMF 7b and GIF 3a, and GIF 3a and transmission-use SMF 2b obtained in a state where the fiber fuse phenomenon is absent was only 0.1 dB or less. In this example, an optical isolator with insertion loss of 1 dB and isolation of 42 dB was used.

EXAMPLE 5

A fiber optics transmission line having the configuration shown in FIG. 9 was prepared, in which a pair of fiber-fuse phenomenon shut-off parts each constituted by a GIF whose MFD was expanded up to 34 µm and core diameter set to 86 µm and an SMF having an MFD of 10 µm were connected to each other by an optical isolator. When an optical signal was transmitted from a Raman amplifier having a wavelength of 1550 nm and an optical power of 2 W into the fiber optics transmission line thus formed, fiber fuse phenomenon occurred. The MFD of a transmission-use SMF at this time was 10 µm. Although fire spreading toward a light source due to the fiber fuse phenomenon started, the fire spreading was shut off in front of the optical isolator. In this example, a transmission-use SMF used commonly was used as an SMF having a small MFD.

The total connection loss between the transmission-use SMF 2a and GIF 3a, between GIF 3a and SMF 12a, between SMF 12a and optical isolator, between optical isolator and SMF 12b, between SMF 12b and GIF 3a, and GIF 3a and transmission-use SMF 2b obtained in a state where the fiber fuse phenomenon is absent was only 0.1 dB or less. In this example, an optical isolator with insertion loss of 1 dB and isolation of 42 dB was used.

The invention claimed is:

1. A fiber optics transmission line comprising:
    a single or a plurality of a graded index fiber inserted in the middle of a transmission line formed by a first single mode fiber, the first single mode fiber including a core having a predetermined refractive index and a cladding having a refractive index smaller than that of the core, the inserted graded index fiber comprising two parts, a first part having its mode field diameter gradually increasing from a light entry side and a second part having its mode field diameter gradually decreasing toward a light exit side; and
    a second single mode fiber having a mode field diameter smaller than an expanded mode field diameter of the graded index fiber, the second single mode fiber being disposed between the first and second parts of the graded index fiber.

2. The fiber optics transmission line according to claim 1, wherein the graded index fiber is fusion spliced to the single mode fiber in the middle of the fiber optics transmission line.

3. The fiber optics transmission line according to claim 1, wherein the length of the graded index fiber having the mode field diameter gradually increasing from the light entry side and decreasing toward the light exit side is ½ of a pitch, where one pitch denotes a length of the transmission line corresponding to one cycle during which the mode field diameter of a light periodically changes along the transmission line.

4. The fiber optics transmission line according to claim 3, wherein the length of the graded index fiber having the mode field diameter gradually increasing from the light entry side and the length of the graded index fiber having the mode filed diameter decreasing toward the light exit side, are both ¼ of a pitch.

5. The fiber optics transmission line according to claim 1, wherein the expanded mode field diameter of the graded index fiber falls within a range from 15 to 85 μm.

6. The fiber optics transmission line according to claim 5, wherein the expanded mode field diameter of the graded index fiber falls within a range from 15 to 65 μm.

7. The fiber optics transmission line according to claim 1, wherein the core diameter of the graded index fiber is 1.5 times or more the expanded mode field diameter of the graded index fiber, which is obtained at a location ¼ of a pitch from the light entry side thereof.

8. The fiber optics transmission line according to claim 7, wherein the core diameter of the graded index fiber is 2 times or more the expanded mode field diameter of the graded index fiber, which is obtained at a location ¼ of a pitch from the light entry side thereof.

9. A fiber optics transmission line comprising:
    a single or a plurality of a graded index fiber inserted in the middle of a transmission line formed by a first single mode fiber, the first single mode fiber including a core having a predetermined refractive index and a cladding having a refractive index smaller than that of the core, the graded index fiber being connected to the first single mode fiber through a connector in the middle of the fiber optics transmission line, the inserted graded index fiber comprising two parts, a first part having its mode field diameter gradually increasing from a light entry side and a second part having its mode field diameter gradually decreasing toward a light exit side; and
    a second single mode fiber having a mode field diameter smaller than an expanded mode field diameter of the graded index fiber being inserted between the two parts of the second single mode fiber being disposed between the first and second parts of the graded index fiber.

10. The fiber optics transmission line according to claim 9, wherein the expanded mode field diameter of the graded index fiber falls within a range from 15 to 85 μm.

11. The fiber optics transmission line according to claim 10, wherein the expanded mode field diameter of the graded index fiber falls within a range from 15 to 65 μm.

12. The fiber optics transmission line according to claim 9, wherein the core diameter of the graded index fiber is 1.5 times or more the expanded mode field diameter of the graded index fiber, which is obtained at a location ¼ of a pitch from the light entry side thereof.

13. The fiber optics transmission line according to claim 12, wherein the core diameter of the graded index fiber is 2 times or more the expanded mode field diameter of the graded index fiber, which is obtained at a location ¼ of a pitch from the light entry side thereof.

14. The fiber optics transmission line according to claim 9, wherein the length of the graded index fiber having a mode field diameter gradually increasing from a light entry side and decreasing toward a light exit side is ½ of a pitch, where one pitch denotes a length of the transmission line corresponding to one cycle during which the mode filed diameter of a light periodically changes along the transmission line.

15. The fiber optics transmission line according to claim 14, wherein the length of the graded index fiber having a mode field diameter gradually increasing from a light entry side and the length of the graded index fiber having a mode filed diameter decreasing toward a light exit side, are both ¼ of a pitch.

16. A fiber optics transmission line comprising:
    a single or a plurality of a graded index fiber inserted in the middle of a transmission line formed by a first single mode fiber, the first single mode fiber including a core having a predetermined refractive index and a cladding having a refractive index smaller than that of the core, the graded index fiber being connected to the first single mode fiber through a v-groove in the middle of the fiber optics transmission line, the inserted graded index fiber comprising two parts, a first part having its mode field diameter gradually increasing from a light entry side and a second part having its mode field diameter gradually decreasing toward a light exit side; and
    a second single mode fiber having a mode field diameter smaller than an expanded mode field diameter of the graded index fiber being inserted between the two parts of the second single mode fiber being disposed between the first and second parts of the graded index fiber.

17. The fiber optics transmission line according to claim 16, wherein the expanded mode field diameter of the graded index fiber falls within a range from 15 to 85 μm.

18. The fiber optics transmission line according to claim 17, wherein the expanded mode field diameter of the graded index fiber falls within a range from 15 to 65 μm.

19. The fiber optics transmission line according to claim 16, wherein the core diameter of the graded index fiber is 1.5 times or more the expanded mode field diameter of the graded index fiber, which is obtained at a location ¼ of a pitch from the light entry side thereof.

20. The fiber optics transmission line according to claim 19, wherein the core diameter of the graded index fiber is 2 times or more the expanded mode field diameter of the graded index fiber, which is obtained at a location ¼ of a pitch from the light entry side thereof.

* * * * *